United States Patent Office 2,881,188
Patented Apr. 7, 1959

2,881,188
3-DEOXY-11,17-OXYGENATED-ANDROSTANES

John C. Babcock, Kalamazoo Township, Kalamazoo County, and Arnold C. Ott, Kalamazoo, Mich., assignors to The Upjohn Company, Kalamazoo, Mich., a corporation of Michigan No Drawing. Application July 20, 1955
Serial No. 523,390
4 Claims. (Cl. 260—397.3)

The novel 3-deoxy-11,17-oxygenated androstanes of the ticularly to 3-deoxy-11,17-oxygenated-androstanes.

The novel 3-deoxy-11,17-oxygenated-androstanes of the present invention may be represented by the following formula:

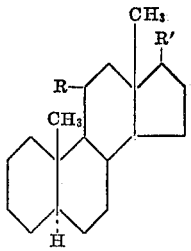

wherein R is keto or β-hydroxy and R' is keto, β-hydroxy, β-hydrocarbonyloxy containing from one to twelve carbon atoms, inclusive, or the combination of α-methyl-β-hydroxy. These compounds, especially androstane-11,17-dione, possess a high order of oral anabolic activity and possess the added advantage of having little or no oral androgenic activity at the same dosage level.

3-deoxy steroids are known in the prior art. See, for example, Kochakian, Proc. Soc. Exptl. Biol. and Med., 80, 386 (1952), Am. J. Physiol. 158, 51 (1949), and Inhoffen et al., Ann., 568, 52 (1950). 3-deoxy-11-oxygenated-androstane series steroids are novel however. In view of the marked loss of activity upon the 11-oxygenation of many hormones, e.g., progesterone to produce 11β-hydroxy or 11-ketoprogesterone, the physiological activity of the 11-oxygenated steroid of the present invention is particularly surprising. Furthermore, a 3-oxygenated function was heretofore believed vital to the activity of 11-oxygenated steroids. We have now found, however, that the 3-deoxy-11-oxygenated steroids of the present invention possess marked physiological activity. The etiocholane steroids corresponding to the compounds of the present invention also possess physiological activity; including androgenic and anabolic activity.

The novel compounds of the present invention can be produced from a variety of steroids. For example, the 3-benzyl thioenol ether of an 11-keto or 11β-hydroxy progesterone, 11,17-dihydroxy-4-androsten-3-one or 4-androstene-3,11,17-trione can be reduced with de-activated Raney nickel to produce a 3-deoxy compound. The diene system of these 3-deoxy steroids can be hydrogenated to produce the corresponding 3-deoxy saturated steroid. The side chain of the 20-keto pregnane series steroids, i.e., $C_{21}$ steroids, can be removed by oxidation or ozonolysis of the 17(20)-enol ester thereof.

Alternatively, starting with 11β,17-dihydroxy-androstan-3-one and performing a Wolff-Kischner reduction of the 3-keto group is productive of a 3-deoxy compound of the present invention.

The 17-hydroxy group of 11β,17β-androstane can be selectively esterified to produce a 17β-acyloxyandrostane-11β-ol wherein the acyl radical is preferably the acyl radical of a hydrocarbon carboxylic acid containing from one to twelve carbon atoms, inclusive. The 11-hydroxy group can then be oxidized with chromic acid, N-bromoacetamide or N-bromosuccinimide to produce a 17β-acyloxyandrostan-11-one. 17β-acetoxyandrostan-11-one can be hydrolyzed to produce 17β-hydroxyandrostan-11-one. Other methods for the production of the novel compounds of the present invention are shown in the examples hereinafter.

The following preparations and examples are illustrative of the products of the present invention and methods for their production, but are not to be construed as limiting.

PREPARATION 1
*11,20-diketo-3,5-pregnadiene*

A mixture of eighteen grams of freshly prepared W–4 Raney nickel catalyst and 250 milliliters of acetone was refluxed for one hour. To the solution was then added 1.8 grams of the 3-benzyl thioenol ether of 11-ketoprogesterone (U.S. Patent 2,698,852) and the mixture was refluxed for four more hours. The cooled solution was filtered and the filtrate distilled at reduced pressure until crystallization of the product occurred. The crystals thus obtained were recrystallized from a mixture of acetone and heptane to give 11,20-diketo-3,5-pregnadiene melting at 138 to 142 degrees centigrade. A second crystallization of these crystals raised the melting point to 141.5 to 143 degrees centigrade. This product had an $E_{228}$ of 17,200, an $E_{234}$ of 18,200, an $E_{242}$ of 11,315, an $[\alpha]_D^{23}$ of plus 41 degrees in chloroform and the analysis below.

Calculated for $C_{21}H_{28}O_2$: C, 80.73; H, 9.03. Found: C, 80.59; H, 9.13.

PREPARATION 2
*Allopregnane-11,20-dione*

A solution of 2.5 grams of 11,20-diketo-3,5-pregnadiene in 100 milliliters of ethyl acetate containing 1.25 grams of a five percent palladium on charcoal catalyst was shaken in a hydrogen atmosphere. The theoretical uptake was rapid and complete. The solution was then filtered and the filtrate distilled to a small volume and then diluted with methanol until crystallization commenced. There was thus obtained 1.72 grams of allopregnane-11,20-dione as plates which melted at 139.5 to 141 degrees centigrade, had an $[\alpha]_D$ of plus 122 degrees in chloroform and the analysis below.

Calculated for $C_{21}H_{32}O_2$: C, 79.69; H, 10.19. Found: C, 79.60; H, 9.97.

A mono-2,4-dinitrophenylhydrazone was prepared which melted at 209 to 210 degrees centigrade.

EXAMPLE 1
*Androstane-11,17-dione*

A solution of 1.2 grams of allopregnane-11,20-dione in 150 milliliters of acetic anhydride containing 0.75 gram of paratoluenesulfonic acid was slowly distilled over a period of four hours to about half its original volume. The remaining acetic anhydride was then distilled at reduced pressure. The residual dark oil of the enol acetate of allopregnane-11,20-dione was dissolved in methylene chloride. The solution was washed free of acid with aqueous sodium bicarbonate and then evaporated to dryness. The residue was dissolved in 200 milliliters of ethyl acetate and the resulting solution was cooled to about zero degrees centigrade and then ozonized with 4.9 millimoles of ozone. The solution was then mixed with fifty milliliters of acetic acid and five grams of zinc dust for two hours. The mixture was filtered and the ethyl acetate solution washed with aqueous sodium bicarbonate and then with water and finally dried. The dry solution was evaporated to dryness leaving a pale yellow oil which was purified by chromatography over a column of Florisil synthetic magnesium silicate. The column was developed with one liter portions of solvents of the following composition and order: five of petroleum ether, one of petroleum ether plus 1.5 percent acetone, one of petroleum ether plus two percent acetone, one of petroleum ether plus 2.5 percent acetone, and one of petroleum ether plus five percent acetone. The petroleum ether plus two percent acetone eluates contained a thin oil which resisted crystallization. This oil was heated with three percent methanolic sodium hydroxide and the mixture was freed of solvent and then mixed with water to give androstane-11,17-dione which, after crystallization from methanol and water, was obtained as either flat needles or plates melting at 129 to 129.5 degrees centigrade. These crystals had an $[\alpha]_D^{23}$ of plus 139 degrees in chloroform and the analysis below.

Calculated for $C_{19}H_{28}O_2$: C, 79.12; H, 9.78. Found: C, 79.67; H, 10.05.

A mono-2,4-dinitrophenylhydrazone was obtained which melted at 283 to 284 degrees centigrade.

EXAMPLE 2

Androstane-11β,17β-diol

To a solution of eighty milligrams of androstane-11,17-dione in two milliliters of isopropyl alcohol is added a solution of eighty milligrams of sodium borohydride in one milliliter of a 0.1 N solution of aqueous sodium hydroxide. The solution is stirred for four days at 37 degrees centigrade. Any remaining sodium borohydride is decomposed with acetone. The solvent is distilled from the mixture at reduced pressure and the residue extracted with methylene chloride. The methylene chloride is washed with water, dried and the solvent distilled to dryness, leaving a residue consisting essentially of androstane-11β,17β-diol. Crystallization of this product from a mixture of acetone and Skellysolve B hexane hydrocarbons yields essentially pure androstane-11β,17β-diol.

EXAMPLE 3

17β-acetoxy-androstane-11β-ol

A solution of 100 milligrams of androstane-11β,17β-diol in a mixture of one milliliter of acetic anhydride and one millilter of dry pyrdine is maintained at about 25 degrees centgrade for about sixteen hours. The excess acetic anhydride was then decomposed with ice water and the resulting precipitate is extracted with benzene. The benzene solution was washed with cold dilute hydrochloric acid, cold aqueous sodium bicarbonate and finally with water and then dried. The dried benzene solution is evaporated to dryness leaving a residue of 17β-acetoxy-androstane-11β-ol.

Similarly, androstane-11β,17β-diol is converted to other 17β-acyloxy-androstane-11β-ols by esterification of the 17β-hydroxy group, e.g., by reaction with the appropriate acid anhydride, acid chloride or bromide, ester by ester exchange, acid in the presence of an esterification catalyst, etc. Examples of 17β-acyloxy-androstane-11β-ols prepared include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2.6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, etc., or a dibasic acid (which can be converted to water soluble, e.g., sodium, salts), e.g., succinic, glutaric, α-methylglutaric, β-methylglutaric, β,β-dimethylglutaric, adipic, pimelic, suberic, etc.

EXAMPLE 4

17β-acetoxy-androstane-11-one

To a solution of eighty milligrams of 17β-acetoxy- androstane-11β-ol and 0.2 milliliter of pyridine in 7.5 milliliters of tertiary butyl alcohol is added fifty milligrams of N-bromoactamide. The mixture is maintained at room temperature for sixteen hours and then diluted with five milliliters of water containing fifty milligrams of sodium sulfite. The tertiary butyl alcohol was then distilled from the mixture and the residue dissolved in methylene chloride. The methylene chloride solution is washed with water, dried and the solvent distilled at reduced pressure to leave a residue of 17β-acetoxy-androstane-11-one.

Saponification of 17β-acetoxy-androstane-11-one with a molar equivalent excess of sodium bicarbonate in a mixture of methanol and water or sodium hydroxide in a mixture of acetone and water is productive of 17β-hydroxy-androstane-11-one.

EXAMPLE 5

11β-hydroxy-androstane-17-one

Following the procedure of Preparation 1 exactly, but substituting an equivalent molar amount of the 3-benzyl thioenol ether of 11β-hydroxy-4-androstene-3,17-dione for the 3-benzyl thioenol ether of 11-ketoprogesterone as the starting steroid, there is thus produced 11β-hydroxy-3,5-androstadien-17-one. Hydrogenating 11β-hydroxy-3,5-androstadien-17-one in exactly the manner described in Preparation 2 is productive of 11β-hydroxy-androstan-17-one.

EXAMPLE 6

17α-methyl-androstane-11β,17β-diol

A solution of methyl magnesium iodide is prepared by reacting one gram of methyl iodide with 290 milligrams of magnesium in twenty milliliters of anhydrous ether. To this solution is added dropwise a solution of 500 milligrams of 11β-hydroxy-androstane-17-one in a mixture of thirty milliliters of ether and twelve milliliters of benzene. The mixture is stirred in a nitrogen atmosphere for seven hours and then decomposed by the dropwise addition of a saturated aqueous solution of ammonium chloride. The solution is decanted from the inorganic precipitate, dried and then evaporated to dryness, to leave a residue consisting essentially of 17α-methyl-androstane-11β,17β-diol. Chromatography of this product over a column of Florisil synthetic magnesium silicate is productive of substantially pure product.

It is to be understood that the invention is not to be limited to the exact details of operation or exact compounds shown and described as obvious modifications and equivalents will be apparent to those skilled in the art and the invention is therefore to be limited only by the scope of the appended claims.

We claim:
1. 3-deoxy-11,17-oxygenated-androstanes represented by the following formula:

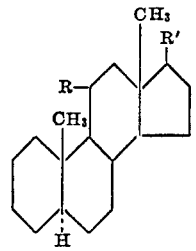

wherein R is selected from the group consisting of keto and β-hydroxy and R' is selected from the group consisting of keto and the combination of α-methyl-β-hydroxy.
2. Androstane-11,17-dione.
3. 17α-methylandrostane-11β,17β-diol.
4. 11β-hydroxyandrostane-17-one.

References Cited in the file of this patent

UNITED STATES PATENTS 2,602,769    Murray _____ July 8, 1952